United States Patent
Denz et al.

[11] Patent Number: 6,065,335
[45] Date of Patent: May 23, 2000

[54] METHOD FOR DETECTING THE FILL LEVEL QUANTITY OF A TANK SYSTEM

[75] Inventors: Helmut Denz, Stuttgart; Andreas Blumenstock, Ludwigsburg; Georg Mallebrein, Singen, all of Germany

[73] Assignee: Robert Bosch GmbH, Stuttgart, Germany

[21] Appl. No.: 08/977,606

[22] Filed: Nov. 25, 1997

[30] Foreign Application Priority Data

Nov. 25, 1996 [DE] Germany .......................... 196 48 688

[51] Int. Cl.$^7$ ................................................ G01F 23/00
[52] U.S. Cl. .................................................. 73/291; 73/299
[58] Field of Search .............................. 73/291, 49.2 T, 73/299

[56] References Cited

U.S. PATENT DOCUMENTS 5,379,638   1/1995   Denz et al. .............................. 73/291
5,898,103   4/1999   Denz et al. .............................. 73/291

Primary Examiner—Hezron Williams
Assistant Examiner—Michael Cygan
Attorney, Agent, or Firm—Walter Ottesen

[57] ABSTRACT

The invention is directed to a method for detecting a fill level of a tank system utilizing a pressure source, a bridge divider arrangement and a pressure measuring device. The pressure source is adapted to generate a change of pressure in the tank system. The pressure divider arrangement has a reference measuring unit which can be charged with pressure by the pressure source. The reference measuring unit further includes at least one flow resistor of a predetermined size in at least one reference flow branch. For measuring the tightness, the pressure measuring device simultaneously detects the difference of the pressure in the tank system and of the pressure in the reference measuring unit. In the method, the time-dependent trace of the difference pressure during at least one of a pressure build-up operation and a pressure decay operation is continuously detected. A conclusion is then drawn as to the fill level from the time-dependent trace.

7 Claims, 1 Drawing Sheet

METHOD FOR DETECTING THE FILL LEVEL QUANTITY OF A TANK SYSTEM

FIELD OF THE INVENTION

The invention relates to a method for detecting the fill level quantity of a tank system by means of a pressure source, a pressure divider arrangement and a pressure measuring device. With the pressure source, a pressure change in the tank system can be generated. The pressure divider arrangement includes a reference measuring unit which can be charged with pressure from the pressure source and includes at least one flow resistor of a specific magnitude in at least one reference flow branch. With the pressure measuring unit, tightness can be checked in that the difference of the pressure in the tank system and the pressure in the reference measuring device is simultaneously detected.

BACKGROUND OF THE INVENTION

A method of the kind described above is disclosed, for example, in U.S. Pat. No. 5,898,103 and incorporated herein by reference. German patent publications 195 02 775 and 195 02 776 disclose a method for checking the tightness by means of a difference flow sensor as well as by means of a difference pressure sensor.

All of these methods permit a tightness check to be made on the tank system. However, with these methods, it is not possible, in addition to the tightness, to detect additional variables, which are specific to the tank, or characteristics of the tank system such as the fill level of a liquid disposed in the tank system.

Thus, for example, to check the fill level, additional float lever transducers are required as shown, for example, in FIG. 3 of the drawings herein. These float lever transducers are however difficult to mount and, furthermore, require a complex evaluation of the fill level transducer signal for a complicated tank geometry because, in this case, mostly a nonlinear relationship is present between the fill height and the fill level.

Furthermore, two float lever transducers are required for tanks having two or more chambers which transducers must be separately evaluated in an especially complicated way.

German patent publication 4,203,099 discloses a method for detecting the tank fill level which, on the one hand, makes possible a check of the tightness of the tank and, on the other hand, permits a determination of the fill level thereof to be made. In this method, the tank is charged with a pressure change and a conclusion is drawn as to the fill level of the tank from the value of a pressure-change gradient variable within a pregiven time span. It is a disadvantage of this gradient method that the fill level, on the one hand, can only be imprecisely detected because a gradient determination is always burdened with an error because of difference formations. On the other hand, the method requires a relatively complex configuration with a plurality of sensors and check devices.

SUMMARY OF THE INVENTION

In view of the above, it is an object of the invention to provide a method for checking the tightness of a tank system which is so improved that a very precise statement as to the fill level of a liquid disposed in the tank system can be made without additional sensors, transducers and the like. For this reason, the method of the invention is cost effective.

The method of the invention is for detecting a fill level of a tank system utilizing a pressure source, a bridge divider arrangement and a pressure measuring device. The pressure source is adapted to generate a change of pressure in the tank system. The pressure divider arrangement has a reference measuring unit which can be charged with pressure by the pressure source and which includes at least one flow resistor of a predetermined size in at least one reference flow branch. The pressure measuring device simultaneously detects, for checking tightness, the difference of the pressure in the tank system and of the pressure in the reference measuring unit. The method includes the steps of: continuously detecting the time-dependent trace of the difference pressure during at least one of a pressure build-up operation and a pressure decay operation; and, drawing a conclusion as to the fill level from the time-dependent trace.

The continuous detection of the time-dependent trace of the difference pressure during the pressure build-up operation and/or during the pressure decay operation and the conclusion as to the fill level from this time-dependent trace affords the special advantage that a tightness check of the tank system is made possible by means of an arrangement for checking the tank system as to tightness without additional sensors, transducers or the like in a simple manner.

In principle, a single flow resistor in a pressure sensor is adequate for detecting a leak and for determining the fill level in a tank system.

An especially advantageous embodiment of the method of the invention, however, provides that the difference pressure is detected with a difference pressure sensor mounted in the bridge diagonal of a pressure divider bridge. A first branch of the bridge includes two flow resistors arranged between the pressure source and the atmosphere. The second branch of the bridge includes a flow resistor of the tank system, which is to be checked for tightness, and a further flow resistor arranged between this flow resistor and the pressure source.

The configuration of the bridge divider arrangement as a pressure divider bridge having a difference pressure sensor arranged in the bridge diagonal affords the advantage that the arrangement is calibrated for a leak to be detected and therefore is independent of tolerances of the pressure source at this operating point. In this way, a very precise determination of the fill level quantity in the tank system is possible. Furthermore, the vaporization from a liquid disposed in the tank system can be determined in a simple manner.

It is also advantageous that the method for determining the fill level quantity of a tank system is independent of ambient pressure of the tank system because of a difference pressure measurement.

The flow resistors are, preferably, so dimensioned that they have the same magnitude as the flow resistance of the smallest leak of the tank system to be diagnosed. It is, however, possible that the flow resistors can have different magnitudes.

A very advantageous embodiment of the method of the invention provides first continuously detecting the time-dependent trace of the difference pressure during the pressure build-up operation; then detecting the time-dependent trace of the difference pressure during the pressure decay operation; making a comparison of the time-dependent traces; and, drawing a conclusion as to the fill level from the comparison.

With the comparison of the time-dependent trace of the difference pressure build-up with the time-dependent trace of the difference pressure decay, an error of the fill level value is avoided which can be caused by vaporization of the liquid disposed in the tank system which can practically not be avoided.

In another advantageous embodiment, the method includes first very rapidly building up a pressure in the tank system via a bypass valve; then closing the bypass valve and switching off the pressure source; and, utilizing the detected time-dependent trace of the difference pressure to draw a conclusion as to the fill level.

With the rapid pumping up of the tank system, this method permits a rapid determination of the fill level quantity of the tank system in an especially advantageous manner.

To eliminate the vaporization of a liquid in the tank system, the vaporization is mathematically estimated in an embodiment of the invention and applied to correct the difference pressure trace.

In a further embodiment, the method includes the further steps of: opening the bypass valve and sealing off the tank system; then, with the bypass valve open and the tank system sealed off, carrying out a separate measuring method to measure the vaporization of a liquid in the tank system; interpreting the measured difference pressure as an offset; then continuously detecting the time-dependent trace of the pressure in the tank system and the reference measuring unit while the tank system is charged with pressure; and, utilizing the difference pressure determined in this way as a correction for the vaporization.

BRIEF DESCRIPTION OF THE DRAWINGS

The invention will now be described with reference to the drawings wherein.

DESCRIPTION OF THE PREFERRED EMBODIMENTS OF THE INVENTION

The method for detecting the fill level of a tank system is explained below with reference to a tank system of a motor vehicle. However, it is understood that the method is not limited to a tank system of a motor vehicle; instead, in principle, the method of the invention can be applied to any desired tank system.

Figure 3:
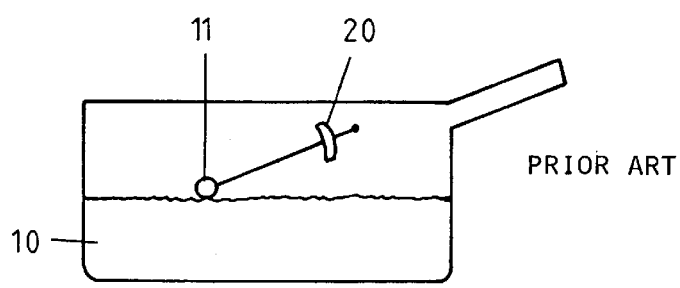

As shown in FIG. 3, a fill level transducer of a motor vehicle tank system known to the state of the art includes a float 11 arranged in a tank 10. The float 11 is connected to a potentiometer 20. An electrical signal is generated in the potentiometer 20 in dependence upon the position of the float 11. The signal is a direct measure for the fill level elevation in the tank 10.

A fill level transducer of the kind referred to above is not necessary in the method explained below for determining the fill level quantity of a tank system of a motor vehicle.

A tank system of a motor vehicle includes a tank 10, which is connected via an active charcoal filter 12 and via a tank-venting valve 14 to an intake pipe 20 of an internal combustion engine (not shown). A throttle flap 22 is mounted in the intake pipe 20.

Hydrocarbon gases develop in tank 10 because of vaporization and these gases deposit in the active charcoal filter 12. The tank-venting valve 14 is opened to regenerate the active charcoal filter 12 so that, because of the underpressure present in the intake pipe 20, air of the atmosphere is drawn by suction through the active charcoal filter 12 whereby the hydrocarbons, which have become deposited in the active charcoal filter 12, are drawn by suction into the intake pipe 20 and conducted to the engine.

A pump 30 is provided to check the tightness of the tank system of the motor vehicle. The pump 30 is connected via a pressure divider bridge 40 to the tank system of the motor vehicle.

The pressure divider bridge 40 includes a first bridge branch 41 in which two flow resistors (42, 43) are connected between the pump 30 and the atmosphere. The second bridge branch 46 includes a further flow resistor 47 which is connected to the tank 10 of the motor vehicle via the active charcoal filter 12. The second branch 46 also includes the flow resistance of the tank system of the motor vehicle.

The flow resistors (42, 43, 47) are so dimensioned that they correspond to the flow resistance of the smallest leak of the tank system to be diagnosed. A difference pressure sensor 50 is mounted in the bridge diagonal.

A leak diagnosis is carried out in advance of the actual fill-level determination.

For making the leakage diagnosis, a pressure in the entire tank system of the motor vehicle is first generated by the pump 30. If no leak is present, then a difference pressure $\Delta p \neq 0$ occurs at the difference pressure sensor 50. This difference pressure signalizes that a leak is not present. If, in contrast, a leak is present and has a magnitude which corresponds to the flow resistors (42, 43, 47), then the pressure divider bridge is balanced so that no difference pressure ($\Delta p = 0$) is detected by the difference pressure sensor 50 and, in this way, the presence of a leak is signaled.

In the case of the non-presence of a leak, a fill-level determination of the tank system is carried out as will be explained below.

The shutoff valve 61 is mounted as a bypass valve to the pressure divider bridge 40. This shutoff valve 61 is closed. Because of the pressure source, the tank system is charged with pressure via the flow resistor 47.

The pressure p1 first increases immediately in the first branch 41 of the pressure divider bridge 40 to one half of the pumping pressure of the pump because the flow resistor 42 has the same magnitude as the flow resistor 43. The pressure p2 in the second branch 46 of the pressure divider bridge 40 increases at a time constant to the pumping pressure of the pump. The time constant is dependent upon the flow resistor 47 and the flow resistance of the entire tank system. A conclusion can be drawn as to the free tank volume and therefore to the fill level from the time-dependent trace of the detected difference pressure.

Figure 1:
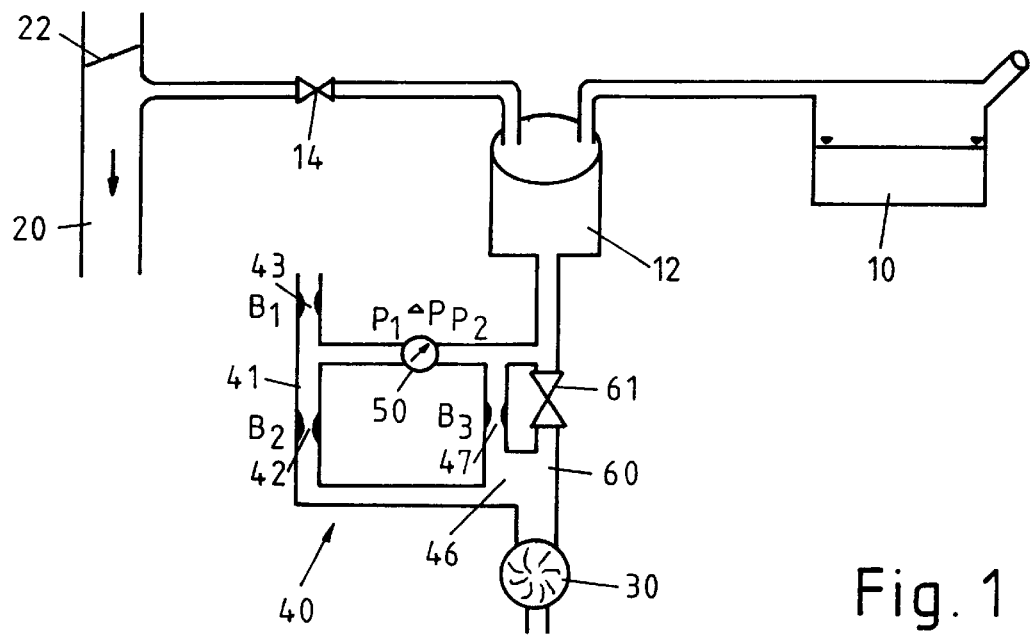
FIG. 1 shows an arrangement for checking the tightness of a tank system of a motor vehicle which is used for carrying out the method of the invention for determining the fill level.
Figure 2A:
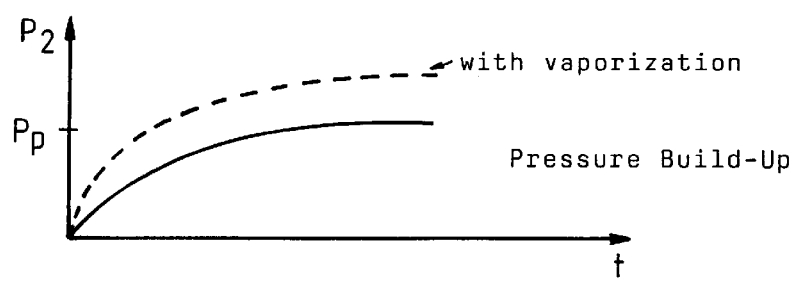
FIG. 2a shows the time-dependent trace of pressure in a tank system of a motor vehicle during a pressure build-up.

The pressure trace of the pressure p2 in the branch 46 is shown in FIG. 2a.

The vaporization of the fuel in the tank system of the motor vehicle becomes manifest as a disturbing quantity. This vaporization effects an additional pressure build-up in the tank system and therefore deceptively indicates a fuller tank. The pressure trace with the vaporization present is shown schematically in FIG. 2a by a broken line. In order to eliminate the vaporization, the pressure decay operation is evaluated in the manner described below in addition to the pressure build-up operation.

The pressure source 30 is switched off after pressure build-up is completed. The shutoff valve 61 as well as the tank-venting valve 14 are closed. The overpressure in the tank system is exclusively allowed to decay via the flow resistor 47 and the flow cross section of the pressure source 30. This flow cross section is very large compared to the flow paths of the pressure divider bridge 40. The pressure p1 then immediately assumes the ambient pressure. In contrast, the pressure p2 drops to the ambient pressure at a time constant which is dependent upon the flow resistor 47 and the flow resistance of the entire tank system. A conclusion can be drawn as to the free tank volume, and therefore to the fill level, from the time-dependent trace of the difference pressure signal. A pressure trace of this kind is shown in FIG. 2b.

Figure 2B:
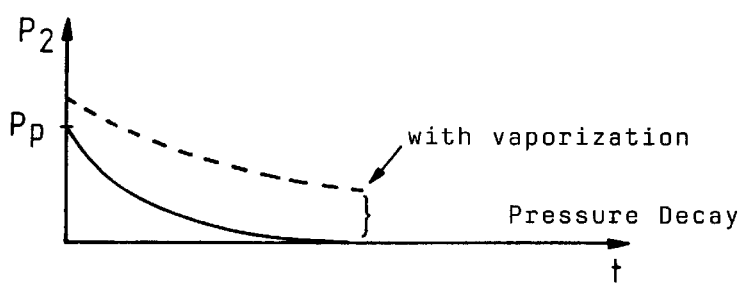
FIG. 2b shows a time-dependent trace of pressure in a tank system of a motor vehicle during a pressure decay; and, FIG. 3 shows an arrangement, which is known from the state of the art, for determining the fill level quantity of a motor vehicle.

As likewise shown in FIG. 2b, the vaporization of the liquid present in the tank system, however, slows down the pressure decay (broken line) and, in this way, deceptively indicates a larger free tank volume (empty tank).

The vaporization can be compensated from the comparison of the two pressure traces during pumping (pressure build-up) and during pressure decay so that the fill level results as a remaining quantity.

This fill level determination can be repeated in each basic adaptation phase, that is, when there is an inactive tank venting. From this, a statistic is possible and the regeneration of the active charcoal filter 12 is not limited. Such a method, however, requires a pressure source having low tolerances. Alternatively, the fill level determination can be obtained in the manner described below in order to be able to use any desired pressure source and especially a pressure source which has no low tolerances of the kind indicated above.

First, the bypass valve 61 is opened and the pressure source 30 is switched on. As a consequence hereof, a rapid pressure build-up in the tank system takes place. After a pregiven time, the bypass valve 61 is closed and the pressure source 30 is switched off. The pressure present now in the tank system decays via the flow resistor 47. The continuously measured time-dependent pressure trace is a measure for the fill level of the tank.

The sought-after tank volume is given by:

$$T_T = \left( T_{sp} \cdot T_T / (p_r(t) - p_o) \cdot \int_o^t m(t) dt \right.$$

The mass flow is then determined via the outflow equation:

$$M = \alpha \cdot A \cdot p_t \cdot \sqrt{2/(R \cdot T_T)} \cdot \sqrt{\chi/(\chi - 1)} \cdot \sqrt{(p_a/p_T)^{2/\chi} - (p_a/p_T)^{(\chi-1)/\chi}}$$

wherein the following apply:
  $v_T$=the tank volume
  $T_T$=the tank temperature
  $p_T$=the tank pressure
  $t_a$=the ambient temperature
  $p_a$=the ambient pressure
  m=the outflowing mass flow
  α=the nozzle coefficient of the flow resistance of the tank system
  A=the area of the flow resistance of the tank system
  χ=the isentropic exponent
  $R_{sp}$=special gas constant
  $P_0$=the start pressure at the start of measurement.

The advantage of this measuring method is a measurement which is independent of the pump capacity of the pressure source 30 because the measurement takes place with the pressure source 30 switched off. Furthermore, and because of the opened bypass valve 61, a rapid pressure build-up is ensured whereby the fill level determination can be made in a short time.

It is, however, problematic that the vaporization of a liquid, which is present in the tank system, can render the measurement incorrect so that it deceptively indicates a fuller tank.

In order to consider this vaporization, the vaporization can, on the one hand, be estimated via the charge of the active charcoal filter 12. For a high vaporization, the fill level measurement is either corrected or suppressed.

On the other hand, the vaporization can, however, also be measured by means of the difference pressure sensor 50. For this purpose, a separate measuring method is carried out wherein the tank-venting valve 14 is closed in a first step thereof for eliminating the difference pressure sensor offset, while the bypass valve 61 is opened. The difference pressure measured in this way is interpreted as a sensor offset and a calibration of the difference pressure sensor takes place.

In a second step, a fill level measurement is made as described above. The result thereof is rendered incorrect by a possibly present vaporization.

In a third step, the rate of vaporization is detected by evaluating the end pressure difference which the difference pressure sensor 50 detects when making a fill level measurement. This end pressure difference is a measure for the vaporization. The greater the vaporization, the greater is the pressure drop at the flow resistor 47 and the greater is the pressure p2 measured in the flow branch 46. The end pressure difference is therefore a measure for the fuel vaporization ($p_{gas}$ in FIG. 2b). With this value, the above-explained fill level measurement can be corrected.

The advantage of this determination of the vaporization is that the fill level measurement is independent of the sensor offset and independent of pump tolerances.

This fill level measurement can be performed in each basic adaptation phase, that is, for an inactive tank venting whereby, on the one hand, a statistic is made possible, and, on the other hand, no limitation of the regeneration rate of the active charcoal filter 12 takes place.

All of the above-described methods are somewhat influenced by a leak which is present. For this reason, a leakage measurement is always first made in order to either correct the fill level result or to suppress the same. For this reason, the arrangement for determining the tightness of a tank system can be especially advantageously combined with a fill level measurement in the manner described above.

The advantage of the above-described method is the continuous detection of the pressure trace which makes possible a precise determination of the fill level. This continuous detection of the time-dependent pressure trace permits especially more precise fill level determinations to be made than in known gradient measurements wherein the pressure trace is always determined over a time span and wherein the changing pressure trace cannot be detected within this time span.

It is understood that the foregoing description is that of the preferred embodiments of the invention and that various changes and modifications may be made thereto without departing from the spirit and scope of the invention as defined in the appended claims.

What is claimed is:

1. A method for detecting a fill level of a tank system utilizing a pressure source, a bridge divider arrangement and a pressure measuring device; said pressure source being adapted to generate a change of pressure in said tank system; said pressure divider arrangement having a reference measuring unit which can be charged with pressure by said pressure source and which includes at least one flow resistor of a predetermined size in at least one reference flow branch; for checking tightness, said pressure measuring device simultaneously detecting the difference of the pressure in said tank system and of the pressure in said reference measuring unit, the method comprising the steps of:

continuously detecting the time-dependent trace of said difference pressure during at least one of a pressure build-up operation and a pressure decay operation; and, drawing a conclusion as to said fill level from said time-dependent trace.

2. The method of claim 1, comprising the further step of detecting said difference pressure utilizing a difference pressure sensor mounted in the bridge diagonal of a pressure divider bridge; said pressure divider bridge including a first branch having first and second flow resistors, which are arranged between said pressure source and the atmosphere, and a second branch having the flow resistance of said tank system, which is to be investigated as to tightness, and a third flow resistor arranged between said tank system and said pressure source.

3. The method of claim 2, comprising the further step of selecting said first, second and third flow resistors so that said flow resistors have the same size as the flow resistance of the smallest leak to be diagnosed.

4. The method of claim 1, comprising the further steps of:

first continuously detecting the time-dependent trace of said difference pressure during said pressure build-up operation;

then detecting the time-dependent trace of said difference pressure during said pressure decay operation;

making a comparison of said time-dependent traces; and, drawing a conclusion as to said fill level from said comparison.

5. The method of claim 1, comprising the further steps of:

first very rapidly building up a pressure in said tank system via a bypass valve;

then closing said bypass valve and switching off said pressure source; and, utilizing the detected time-dependent trace of said difference pressure to draw a conclusion as to said fill level.

6. The method of claim 5, comprising the further steps of:

mathematically estimating the vaporization of a liquid present in said tank system; and, applying the estimate as a correction of the trace of said difference pressure trace.

7. The method of claim 5, comprising the further steps of:

opening said bypass valve and sealing off said tank system;

then, with said bypass valve open and said tank system sealed off, carrying out a separate measuring method to measure the vaporization of a liquid in said tank system;

interpreting the measured difference pressure as an offset;

then continuously detecting the time-dependent trace of the pressure in said tank system and said reference measuring unit while said tank system is charged with pressure; and, utilizing the difference pressure determined in this way as a correction for said vaporization.

* * * * *